United States Patent [19]

Johanson

[11] Patent Number: 4,659,976
[45] Date of Patent: Apr. 21, 1987

[54] METHOD AND APPARATUS FOR MAXIMIZING UTILIZATION OF AN ELECTRIC MOTOR UNDER LOAD

[75] Inventor: Fredrick R. Johanson, Westerville, Ohio

[73] Assignee: Dresser Industries, Inc., Dallas, Tex.

[21] Appl. No.: 726,709

[22] Filed: Apr. 24, 1985

[51] Int. Cl.[4] .............................................. H02P 7/28
[52] U.S. Cl. ..................................... 318/332; 318/434; 318/432; 318/490
[58] Field of Search ............... 318/314, 317, 318, 326, 318/327, 432, 433, 434, 436, 437, 438, 461, 462, 463, 464, 465, 456, 471, 472, 473, 490, 333, 334, 332, 611, 628, 634, 689

[56] References Cited

U.S. PATENT DOCUMENTS

| | | | |
|---|---|---|---|
| 3,657,623 | 4/1972 | Fludzinski | 318/332 X |
| 3,955,130 | 5/1976 | Graf | 318/332 |
| 4,201,936 | 5/1980 | Roumanis | 318/318 X |
| 4,311,949 | 1/1982 | Pelkmann et al. | 318/318 X |
| 4,317,176 | 2/1982 | Saar et al. | 318/332 X |
| 4,322,668 | 3/1982 | Trussler et al. | 318/432 |
| 4,346,434 | 8/1982 | Morinaga | 318/341 X |
| 4,410,846 | 10/1983 | Gerber et al. | 318/327 X |
| 4,413,212 | 11/1983 | Okamoto et al. | 318/327 X |
| 4,459,525 | 7/1984 | Hasegawa | 318/618 X |
| 4,476,417 | 10/1984 | Zimmermann | 318/329 |
| 4,480,217 | 10/1984 | Robbins et al. | 318/618 |
| 4,491,776 | 1/1985 | Veale | 318/617 X |
| 4,507,592 | 3/1985 | Anderson | 318/618 X |
| 4,513,381 | 4/1985 | Houser, Jr. et al. | 318/305 X |

Primary Examiner—Charles D. Miller
Assistant Examiner—Shik Luen Paul Ip
Attorney, Agent, or Firm—Sigalos & Levine

[57] ABSTRACT

The present invention relates to an electronic device that is used to calculate the actual torque being produced by an electric motor at any instant in time and comparing this value of torque ratiometrically either with the maximum (peak) torque that the motor could produce under the line voltage available at that instant or with rated motor torque, thus giving an indication of whether the motor is approaching stall or is under utilized or over utilized.

21 Claims, 8 Drawing Figures

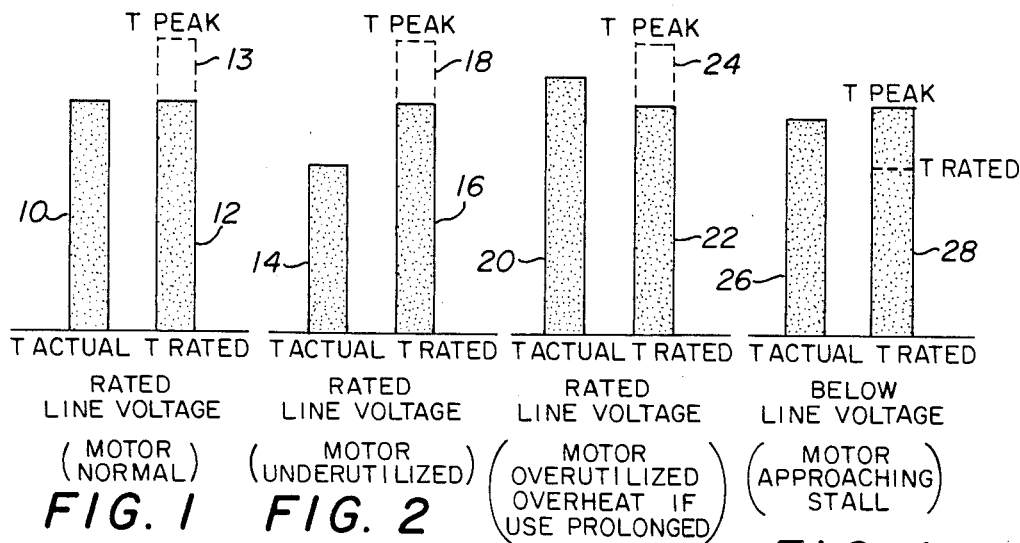
FIG. 1 · FIG. 2 · FIG. 3 · FIG. 4
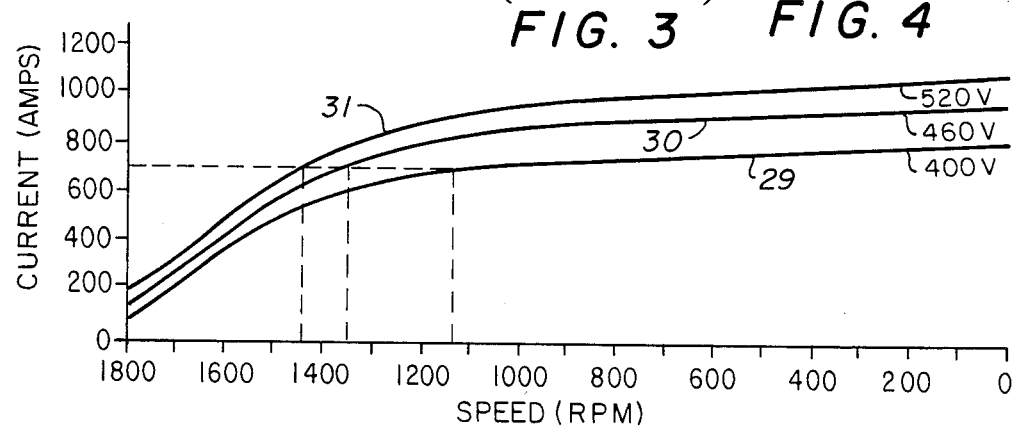
FIG. 5
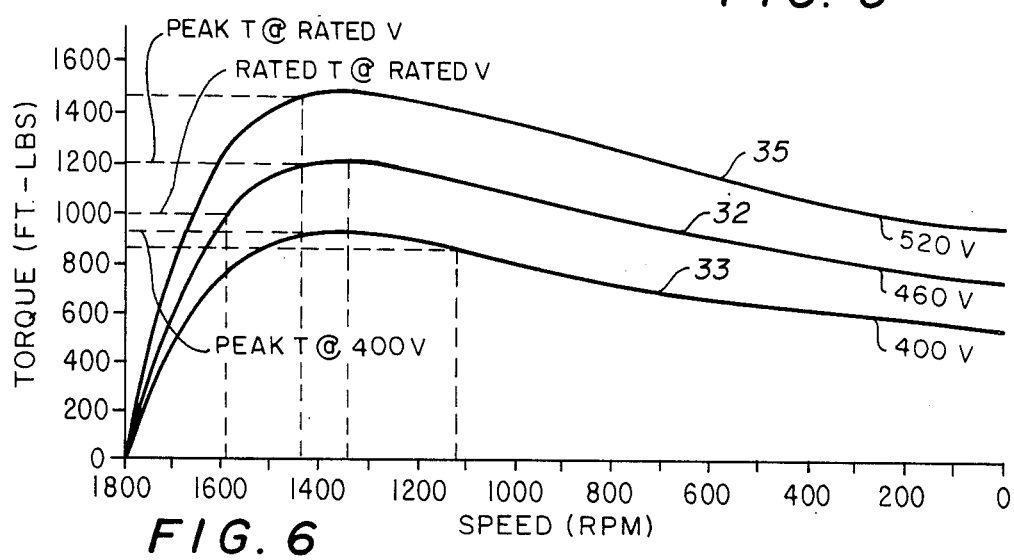
FIG. 6

METHOD AND APPARATUS FOR MAXIMIZING UTILIZATION OF AN ELECTRIC MOTOR UNDER LOAD

BACKGROUND OF THE PRESENT INVENTION

The present invention relates to a method and apparatus for maximizing the utilization of an electric motor under load and in particular relates to an electronic device that is used to calculate the actual torque being produced by an electric motor at any instant in time and comparing this value of torque ratiometrically either with the maximum (peak) torque that the motor could produce under the line voltage available at that instant or with rated motor torque (the torque the motor can produce without overheating at rated voltage), thus giving an indication of whether the motor is approaching the breakover torque point (the point at which peak torque is available) or is under utilized or over utilized.

Various electrical motors, such as those used with underground mining machinery, operate with wide variations in motor voltage. Typical values are in the range from fifteen percent above nominal down to twenty-five percent below nominal. This is caused by poor highline regulation in the power distribution system to the mine, voltage drop in the power center used to reduce the highline voltage to the operating voltage, and the voltage drop in long electrical cables connecting the motor to the power center. Since the maximum torque that a conventional induction motor can produce is approximated by a second order relationship of actual operating voltage, the motor can produce much higher than rated maximum peak torque when operating with over voltage and much lower than rated maximum peak torque when operating at under voltage. Since it is recognized that electric motor performance is bounded by both horsepower and torque capabilities, it is important that maximum use be made of the torque capability of the motor.

Since the maximum or peak motor torque that an induction motor can produce is quite variable from its nominal or rated value, and because the peak motor torque varies considerably in particular operations with poor voltage regulation such as with coal mining equipment, a given motor torque load may cause the motor to stall when the line voltage is low. This sometimes results in damage to the motor. However, under conditions of high operating voltage, it is possible that the motors are being under utilized because they can produce greater torque which means that production rates have not been maximized.

The present invention provides a method and apparatus for determining the actual torque being produced by a motor and allows this value to be compared to the peak torque that would be available under the instantaneous operating voltage thereby warning of impending motor stall conditions, or allows the measured torque to be compared to the rated torque at a particular line voltage that would be available under the instantaneous operating conditions thereby warning the operator of potential overheating conditions if the actual torque exceeds the rated torque.

Thus, the present invention overcomes the disadvantages of the prior art by allowing maximum use of the torque capability of an electric motor.

It is an object of the present invention to generate signals representing the actual motor torque at a particular instant and comparing it with the rated motor torque and generating a control or warning signal if the calculated actual torque exceeds the rated torque thereby warning the operator of a potential overheating condition.

It is also an object of the present invention to compare the instantaneous motor torque with the peak motor torque for the instantaneous line voltage thereby giving an indication of approaching motor stall to the operator.

It is a further object of the present invention to use the potential overheat warning signals or the approaching stall warning signals to automatically reduce the load on the electric motor thereby preventing damage thereto.

It is still another objection of the present invention to compare the actual torque of the motor with the rated torque available at the instantaneous operating voltage whereby the motor load may be increased if the actual torque is below the rated torque available thereby maximizing the use of the electric motor.

SUMMARY OF THE INVENTION

Thus, it is an object of the present invention to disclose a method of maximizing the utilization of an electric motor under load comprising the steps of generating a first signal representing the instantaneous speed of said motor at the existing line voltage, generating a second signal representing the actual torque of said motor at said speed and voltage, storing third and fourth signals representing, respectively, the rated and peak torques of said motor at said existing line voltage, and providing a comparison of said second signal representing actual torque with either said third or fourth signals representing rated or peak torque whereby said load on said motor may be varied in accordance with said comparison to obtain maximum utilization of said motor.

The invention also relates to apparatus for maximizing the utilization of an electric motor under load comprising means for generating a first signal representing the instantaneous speed of said motor at the existing line voltage, means for generating a second signal representing the actual torque of said motor at said speed and voltage, means for storing third and fourth signals representing, respectively, the rated and peak torques of said motor at said existing line voltage, and means for providing a comparison of said second signal representing actual torque with either said third or fourth signals representing rated or peak torque whereby load on said motor may be varied in accordance with said comparison to obtain maximum utilization of said motor.

BRIEF DESCRIPTION OF THE DRAWINGS

These and other detailed objects of the present invention will be disclosed in conjunction with the accompanying specification and drawings in which:

FIG. 1 represents a comparison of actual torque of an electric motor at rated line voltage with the rated torque at that line voltage illustrating that the motor is being utilized to its maximum effectiveness;

FIG. 2 is a graph comparing actual torque of a motor at rated line voltage with the rated torque of a motor at that line voltage and showing that the electric motor is being under utilized in that the actual torque is less than the rated torque;

FIG. 3 is a graph comparing the actual torque of a motor at rated line voltage with its rated torque at that voltage wherein the actual torque is exceeding the rated torque thereby over utilizing the motor and causing an overheat condition if the condition is prolonged;

FIG. 4 is a graph illustrating the comparison of the actual torque of a motor to the peak or maximum torque available for that motor at below line voltage thereby indicating that with the actual torque shown, the motor is approaching the breakover torque point thereby endangering the physical condition of the motor.

FIG. 5 is a graph of motor speed versus current and illustrating a family of curves for voltages at, over, and under rated line voltage;

FIG. 6 is a graph of a family of curves representing torque versus speed of electric motor at, over, and under rated line voltage;

DETAILED DESCRIPTION OF THE DRAWINGS

Figure 7:
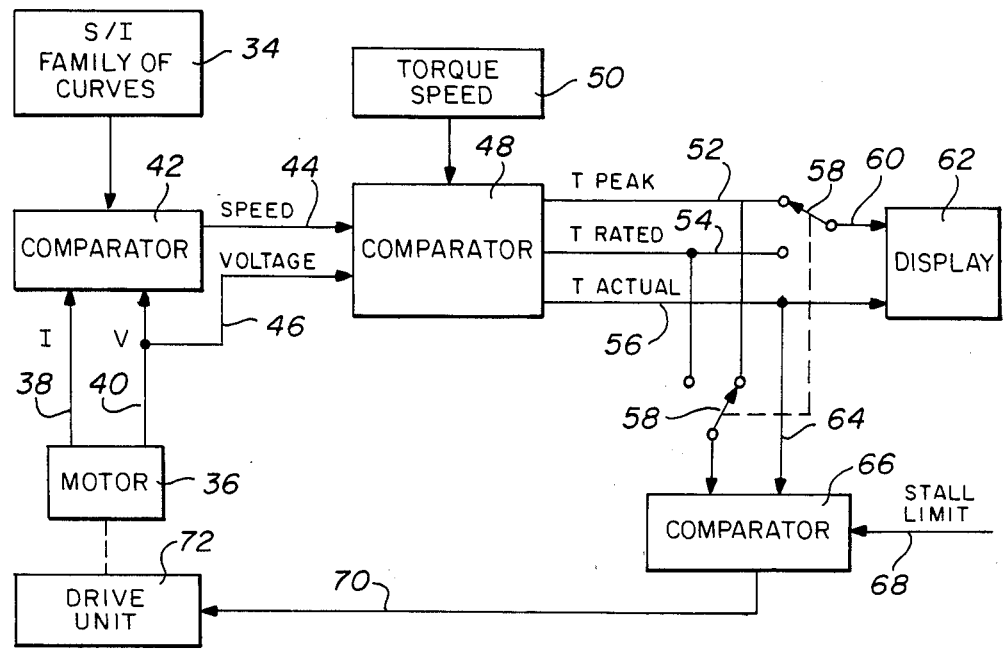
FIG. 7 is a block diagram of apparatus for determining the actual torque of a motor at a particular line voltage and comparing it with either rated or peak torque and displaying the comparison for operator use, as well as apparatus for utilizing the result of the comparison to control the load on the motor to achieve maximum utilization thereof.

Certain machinery, such as underground mining machinery, operates with wide variations in motor voltage. Typical values are in the range from fifteen percent above nominal down to twenty-five percent below nominal. This is cause by poor highline regulation in the power distribution system to the mine, voltage drop in the power center used to reduce the highline voltage to the machinery operating voltage, and the voltage drop in the five hundred to one thousand foot electrical cable connecting the equipment to the power center. Different types of electric motors may be used of course, but for purposes of simplicity the discussion here will relate to induction motors. It will be understood that the principles will apply to other types of motors although specific details such as current/speed curves and torque/speed curves may vary. The maximum torque that a conventional induction motor can produce is approximated by a second order relationship of operating voltage. Therefore, the peak torque available is the voltage ratio squared times the rated peak torque or, $$T_{pa} = T_{pr} \times (V_a/V_r)^2$$

where $T_{pa}$ equals peak torque available, $T_{pr}$ equals rated peak torque at rated line voltage, $V_a$ equals actual operating voltage, and $V_r$ equals rated motor voltage.

This means that when a motor is operated at 15 percent over voltage, it can produce 132 percent of rated peak torque and when operating at 25 percent under voltage, it would be capable of producing only 56 percent of rated peak torque. It should be recognized that electric motor performance is bounded by both horsepower and torque capability. The peak motor torque that an induction motor can produce is quite varied from its nominal value. Because of this variability, particularly with coal mining equipment and the inherent poor voltage regulation associated with it, a given motor torque load may cause the motor to stall when the line voltage is low. Obviously this may result in damage to the motor. On the other hand, if the line voltage is high, it is possible that the motors are being under utilized which means that production rates have not been maximized. By determining the actual torque being produced and comparing it to either the peak torque that would be available under the instantaneous operating conditions or to the rated motor torque, it can be determined whether or not the electric motor is being under utilized, over utilized, operating at maximum potential, or is approaching the torque breakover condition.

Thus, as as can be seen in FIG. 1, the bar 10 representing actual torque and the bar 12 representing rated torque of a motor at rated line voltage are shown to be equal. Thus the motor is operating under normal conditions and its use is maximized. It will be noted in FIG. 1 that the peak torque 13 which is capable of being produced by the motor at rated line voltage is considerably above the actual torque. Under transitory heavy load conditions, the motor can produce the peak torque 13 as necessary. Obviously through, if the motor continues to operate in the peak torque range, that is above rated torque 12, the motor will tend to overheat as the use is prolonged.

In FIG. 2, the bar 14 representing actual torque is less than the bar 16 representing rated torque at rated line voltage. Under these conditions it is obvious that the motor is being under utilized and can absorb a heavier load or more torque in order to increase the bar chart 14 to the same height as the bar chart 16. Again, the peak torque 18 of the motor is available for heavy loads over short periods of time.

In FIG. 3, the bar 20 representing actual torque is of a greater magnitude than the bar 22 representing the rated torque at rated line voltage. In this case it can be seen that the actual torque represented by bar chart 20 is greater than rated torque but less than the peak torque 24. This condition indicates that if the motor continues to operate with that amount of load being applied to it that it will overhead and, thus, the load should be reduced.

FIG. 4 is a bar chart representing the condition when the line voltage to the motor has dropped below rated line voltage while the actual torque 26 has remained constant because of the load. Because the line voltage has dropped, in accordance with the equation set forth previously for maximum torque, it will be understood that the maximum or peak torque capable of being generated by the motor has dropped considerably. This may cause the actual torque 26 to be approaching the peak torque capabilities of the motor as represented by bar 28. In this case, not only will the motor continue to overheat but if the voltage drops lower or the load should suddenly increase, the motor would in fact stall and, perhaps, suffer severe damage.

Thus the conditions represented by the bar charts in FIGS. 2, 3, and 4 need to be avoided and the present invention establishes a means for accomplishing that purpose.

FIG. 5 is a family of voltage curves plotted as a function of current and speed for an induction motor. While only a few curves are shown, obviously they can be created for as many voltages as desired. As can be seen in FIG. 5, if the motor is rated at 460 volts shown by the curve 30, and if the motor is operating with a load current of 700 amps, the speed of the motor will be approximately 1350 rpm. If the voltage is suddenly dropped to 40 volts as shown by curve 29 and the current or load is to remain constant at 700 amps, the motor speed suddenly drops to approximatley 1130 rpm, thus indicating that the motor, at the lower voltage, is much less capable of handling the same load.

The result of such a change in load can be seen in FIG. 6. Assume that the motor has a rated line voltage of 460 volts as shown by curve 32, that it has a rated torque of 1000 foot pounds at approximately 1600 rpm. It will be noted that the rated torque of approximately 1000 foot pounds is well below the peak torque available of approximately 1200 foot pounds at approximately 1350 rpm. Now suppose that the line voltage drops to 400 volts as shown by curve 33. It will be noted that the motor at 400 volts only produces a peak torque of approximately 900 foot pounds, but if the load has not changed and is still at 1000 foot pounds of torque, the motor would stall, being unable to generate the required torque under those conditions.

One the other hand, if the line voltage should increase to 520 volts as shown by curve 35, the torque available to that motor at 1600 rpm is approximately 1300 foot pounds. Thus, if the load remains the same at 1000 foot pounds, the load is well below the 1300 foot pounds that could be safely generated and far below the approximately 1450 foot pounds of peak torque that could be generated at the increased line voltage. In this condition, the motor would be under utilized.

In order to utilize the data set forth in FIG. 6 to calculate the actual torque, the peak torque available, and the rated torque at a particular voltage, it is necessary that the speed and voltage of the motor be known under instantaneous conditions. The voltage of the motor can of course be monitored continually simply by measuring the line voltage. Therefore, knowing the instantaneous current and the instantaneous voltage, the speed of the motor at any instant can be calculated by utilizing the graph shown in FIG. 5. Thus, knowing that the current is 700 amps and instanteous voltage is 460 volts, from the graph the speed of the motor can be determined to be approximatley 1350 rpm. Speed of the motor could be determined in other ways such as by the use of shaft rotation sensors, as is well known.

Once the speed is known, a comparison can be made in FIG. 6 of the instantaneous speed and line voltage and the actual torque of the motor can be determined. Thus, if the motor is operating at approximately 1600 rpm and the voltage is rated line voltage of 460 volts as indicated by curve 32, the actual torque being produced is approximately 1000 foot pounds. Further, each of the curves establishes the peak torque that can be obtained by the motor under any one of the particular voltages. Thus, at 520 volts the peak torque is approximately 1450 foot pounds, at 460 volts the maximum or peak torque is approximately 1200 foot pounds, and at 400 volts the maximum or peak torque is approximately 900 foot pounds. Thus, from the curves shown in FIG. 6, signals can be generated representing the actual torque at any instant and rated torque or the peak torque that is available at that instant. These signals can be compared and this generates the information that is necessary to maximize the use of the motor.

FIG. 7 illustrates a circuit which could obtain the information necessary to generate signals representing actual torque, peak torque, and rated torque at line voltage and comparing these signals so that the motor use could be controlled effectively. Thus in FIG. 7, a family of speed/current curves such as that shown in FIG. 5 is stored in a memory unit 34. The motor 36 in question has its current 38 and voltage 40 monitored constantly. A comparator 42 looks at the monitored current and voltage and in any well-known manner compares those instantaneous values with the speed/current curves stored in memory 34 such as shown in FIG. 5 and from the given current and voltages determines the speed of the motor at that instant. A signal is generated on line 44 representing the instanteous speed and along with the voltage on lines 40 and 46 is coupled to a second comparator 48. A series or family of torque/speed curves such as those shown in FIG. 6 is stored in memory 50. Comparator 48 looks at the speed and voltage signals incoming on lines 44 and 46 and compares them with the torque/speed family of curves stored in memory 50 and generates outputs on line 52 representing peak torque at the input voltage, line 54 representing rated torque at that voltage, and line 56 representing actual torque at that voltage. A switch 58 allows the operator to look at either the signal representing peak torque on line 52 or rated torque on line 54. This selected signal is coupled on line 60 to display 62 along with the actual torque signal on line 56. Thus a bar chart may be displayed on display 62 such as those shown in FIGS. 1 through 4. Obviously other types of displays may be utilized such as digits, curves, or other analog arrangements such as light representing one signal being greater than another or equal to the other. Thus, if the operator were to see on display 62 the graph shown in FIG. 1 he would know that the motor is operating at its maximum use because its actual torque is equal to its rated torque. If the display in FIG. 2 were shown, he would realize that the motor is being under utilized and would increase the load on the motor such as, for example, in mining equipment, by causing the miner to move more rapidly into the coal vein being removed. On the other hand, if the display 62 illustrated the bar chart shown in FIG. 3, the operator would realize that the actual torque being generated by the motor is greater than its rated torque and that if such operation continues the motor will overheat and thus he can remove some of the load that is being applied to the motor thus allowing the actual torque to decrease. In like manner, if the peak torque is selected by switch 58 and displayed on display 62 such as that shown in FIG. 4, the operator would realize that the actual torque of the motor is approaching the peak torque that it is capable of producing and thus it is approaching a stall condition. He can again reduce the load being applied to the motor and thus protect the motor and prolong its life.

In addition, an automatic control of the motor load can be utilized as shown in FIG. 7. Thus, when switch 58 is in the peak torque position, the actual torque signal on line 64 is compared by comparator 66 to a warning signal on line 68 which is established to represent a value of actual torque with respect to peak torque at any given line voltage signifying approaching motor stall. Thus as can be seen in FIG. 6, with a rated voltage of 460 volts and a peak torque of 1200 foot pounds, certainly the warning signal could be set at 1100 foot pounds and if the actual torque equals or exceeds 1100 foot pounds, the signal represented on line 68, comparator 66 produces an output on line 70 which is a control signal used in any well-known manner to drive a control unit 72 which operates to lessen the load on motor 36. For instance in mining equipment, unit 72 may be a miner drive unit such as an electric motor which is forcing the auger or bit being driven by motor 36 into the coal. By controlling the armature voltage, for instance, the drive unit 72 can be caused to reduce its force on the auger or bit which will lessen the load on motor 36 and thus automatically prevent a dangerous stall condition from occurring.

In like manner, when switch 58 is in the rated torque position the signal from comparator 48 on line 54 is coupled to comparator 66. In that instant, it is simply compared along with the actual torque signal on line 64 and if it is equal to the actual torque signal then comparator 66 does not produce an output on line 70 and unit stays operating at its present load condition. However, if the actual torque signal on line 64 is less than the rated torque signal on line 54, then comparator 66 will produce an output on 70 which drives unit 72 to increase the load on motor 36. In like manner, if the actual torque signal on line 64 is greater than the rated torque signal on line 54, comparator 66 will produce an output on line 70 causing drive unit 72 to reduce the load on motor 36.

Figure 8:
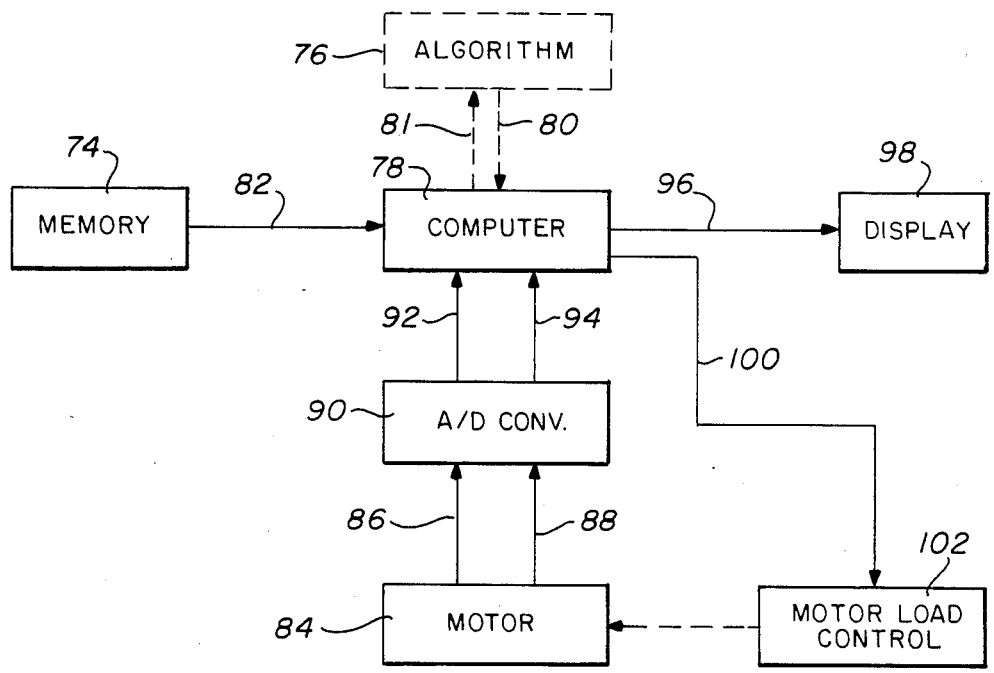
FIG. 8 is a second embodiment of the apparatus utilizing a computer for monitoring the motor operating conditions and displaying the comparison of actual torque to either rated or peak torque and developing control signals to adjust the load on the motor to maximize utilization thereof.

FIG. 8 is a diagram of an alternative embodiment which can be utilized to generate the necessary torque comparisons and control signals by the use of a computer. Again, the necessary speed/current data represented by the family of curves in FIG. 5 and the speed/torque curves represented by the curves in FIG. 6 can be stored in memory unit 74. Alternatively, calculating unit 76 can use an algorithm to calculate any one of the family of curves for both speed and current and speed and torque for any given voltage and current. Such algorithm to generate a motor current/speed curve could be $$I_a = I_r(V_a/V_r)$$

whre $I_a$ equals actual current, $I_r$ equals current from rated curve, $V_a$ equals actual motor voltage, and $V_r$ equals rated voltage. The rated current/speed curve can thus be scaled by the ratio of actual voltage divided by rated voltage. The algorithm could be further modified to take magnetic saturation effects into consideration if desired. The output of unit 76 then can be coupled to the computer 78 through line 80. Thus the computer 78, utilizing either the data from memory 74 on line 82 or the data generated by the algorithm 76 on lines 80 and 81, can compare that data to the voltage and current signals being generated by motor 84. The current utilized by motor 84 as represented by line 86 and the voltage applied to motor 84 as represented by line 88 is coupled to an A-to-D converter 90 where the analog signals are converted to digital signals and coupled through lines 92 and 94, respectively, to computer 78. There computer 78 can make the comparison between the digital input data from the motor representing voltage and current with the data that is stored or calculated by the algorithm representing the appropriate speed/current curve and the speed/torque curve and generate on its output 96 the peak torque, rated torque, and actual torque. Again, these signals can be coupled to display 98 in the form of bar charts shown as shown in FIGS. 1 through 4 or by any other convenient analog or digital representation. In like manner, control signals can be generated on line 100 which are coupled to a motor load control unit 102 which vary the load on motor 84 as explained previously.

Rated torque is normally described as the torque the motor can produce without overheating at rated voltage. However, the torque capability will change with voltage. As an example, with very low or very high line voltages, the torque potential of the motor without overheating is severely reduced. Normally there will be little variation over a ±10% voltage span, but with the line at a ±25% variation, it is possible for the rated torque to be 20-30% above or below the value at rated voltage. This can be accommodated by listing the rated torque values at various voltages in computer memory. It is also possible to generate rated torque values with a rather complex algorithm.

Thus there has been disclosed a novel method and apparatus for improving productivity of an electric motor by displaying to the operator the actual torque in use by a motor-driven auger or conveyor or the like in comparison with a maximum torque available from these motors or the rated torque available from the motors. The information is displayed to the operator by two vertical bar graphs with an accuracy within five percent. This permits the operator to maximize the use of each motor just short of motor stall. The net result is greater productivity and fewer motor problems. Also, there has been disclosed a method and apparatus for utilizing the signals developed to automatically control the load applied to the motor so that it can maintain its torque at maximum utilization of the motor without any danger of overheating or stall.

While the invention has been described in connection with a preferred embodiment, it is not intended to limit the scope of the invention into the particular form set forth, but, on the contrary, it is intended to cover such alternatives, modifications and equivalents as may be included within the spirit and scope of the invention as defined by the appended claims.

I claim:

1. A method of adjusting the load on an electric motor having a known speed/torque relationship to maximize its utilization comprising the steps of:
   a. generating a first signal representing the actual instantaneous speed of said motor;
   b. generating a signal representing the actual instantaneous motor line voltage;
   c. comparing said first generated speed signal to data representing a known speed/torque relationship of said motor at said instantaneous voltage to generate a second signal representative of instantaneous actual torque, a third signal representative of rated torque and a fourth signal representative of peak torque at said instantaneous line voltage;
   d. comparing said third or fourth signals representing, respectively, the rated or peak torques of said motor at said instantaneous line voltage with said second signal representing actual torque; and
   e. varying said load on said motor in accordance with said actual torque comparison to obtain said maximum utilization of said motor.

2. A method of maximizing the utilization of a motor under load as in claim 1 wherein the step of generating a first signal representing the speed of said motor comprises the steps of:
   a. storing data signals representing a family of the motor current/speed characteristic curves at, over, and under rated line voltage;
   b. generating signals representing actual instantaneous motor operating current; and
   c. generating a signal representing the speed of said motor by comparing said signals representing said actual instantaneous voltage and current with said signals representing said family of current/speed/voltage curves.

3. A method as in claim 1 wherein the step of generating a first signal representing the speed of said motor comprises the steps of:
   a. generating signals representing actual instantaneous motor operating current;
   b. utilizing an algorithm to computer generate signals representing a motor current/speed characteristic curve at said actual instantaneous line voltage; and
   c. generating a signal representing the speed of said motor by comparing said signals representing said actual instantaneous voltage and current with said signals representing said current/speed/voltage curve.

4. A method as in claim 2 or 3 wherein the step of generating said second signal representing actual torque of said motor comprises the steps of:
   a. storing data signals representing the family of speed/torque characteristic curves at, over, and under rated line voltage,
   b. comparing said signals representing said actual instantaneous speed and voltage with said signals representing said stored family of speed/torque/voltage curves; and
   c. generating said second signal representing actual torque when a comparison is found between said actual instantaneous speed and voltage and said stored speed and voltage.

5. A method as in claim 4 wherein the step of providing a comparison of said actual torque with either of said third or fourth signals representing said peak or said rated torque comprises the steps of:
   a. coupling said second signal representing said actual torque to a visual display; and
   b. selectively coupling either said third signal representing said rated torque or said fourth signal representing said peak torque to said display whereby a visual comparison of said actual torque with either said rated torque or said peak torque may be displayed thereby enabling an operator to control said motor load according to said comparison.

6. A method as in claim 4 further including the steps of:
   a. comparing said second signal representing said actual motor torque with said third signal representing said rated torque;
   b. generating a control signal when said second signal representing actual torque exceeds said third signal representing rated torque thereby indicating a possible motor overheat condition; and
   c. utilizing said control signal to reduce said motor load until said actual motor torque is equal to said rated torque.

7. A method as in claim 4 further including the steps of:
   a. establishing a warning signal representing a value of actual torque with respect to peak torque at any given line voltage signifying approaching motor stall;
   b. comparing said second signal representing actual torque with said established motor stall warning signal;
   c. generating a control signal when said second signal representing said actual torque exceeds said established motor stall warning signal thereby indicating approaching motor stall; and
   d. utilizing said control signal to reduce said motor load until said actual motor torque is less than said established stall warning signal.

8. A method as in claim 2 or 3 wherein the step of generating said second signal representing actual torque of said motor comprises the steps of:
   a. utilizing an algorithm to computer generate signals representing a motor speed/torque characteristic curve at said actual instantaneous line voltage; and
   b. generating said signal representing said actual torque of said motor by comparing said signals representing said actual instantaneous voltage and speed with said computer generated signals representing said torque/speed/voltage curve.

9. A method as in claim 1 further including the step of utilizing an induction motor as said electric motor.

10. Apparatus for adjusting the load on an electric motor having a known speed/torque relationship to maximize its utilization comprising:
    a. means for generating a first signal representing the instantaneous speed of said motor;
    b. means for generating a signal representing the actual instantaneous motor line voltage;
    c. means for comparing said first generated speed signal to data representing a known speed/torque relationship of said motor at said instantaneous voltage to generate a second signal representative of instantaneous actual torque, a third signal representative of rated torque, and a fourth signal representative of peak torque at said instantaneous line voltage;
    d. means for comparing said third or fourth signals represnting, respectively, the rated or peak torques of said motor at said instantaneous line voltage with said second signal representing actual torque for generating a signal representing the difference between said rated and peak torque and said actual torque; and
    e. means coupled to said torque comparing means for varying said load on said motor in accordance with said actual torque comparison to obtain said maximum utilization of said motor.

11. Apparatus for maximizing the utilization of a motor under load as in claim 10 wherein said means for generating a first signal representing the speed of said motor comprises:
    a. means for storing data signals representing a family of the motor current/speed characteristic curves at, over, and under rated line voltage;
    b. means for generating signals representing actual instantaneous motor operating current; and
    c. means for generating a signal representing the speed of said motor by comparing said signals representing said instantaneous voltage and current with said signals representing said family of current/speed/voltage curves.

12. Apparatus as in claim 11 or 16 wherein the means for generating said second signal representing actual torque of said motor comprises:
    a. means for storing data signals representing the family of speed/torque characteristic curves at, over, and under rated line voltage;
    b. means for comparing said signals representing said actual instantaneous speed and voltage with said signals representing said stored family of speed/torque/voltage curves; and
    c. means for generating said second signal representing actual torque when a comparison is found between said actual instantaneous speed and voltage and said stored speed and voltage.

13. Apparatus as in claim 12 wherein the means for providing a comparison of said actual torque with either of said third and fourth signals representing said peak or said rated torque comprises:
   a. means for coupling said second signal representing said actual torque to a visual display; and
   b. means for selectively coupling either said third signal representing said rated torque or said fourth signal representing said peak torque to said display whereby a visual comparison of said actual torque with either said rated torque or said peak torque may be displayed thereby enabling an operator to control said motor load according to said comparison.

14. Apparatus as in claim 12 further comprising:
   a. means for comparing said second signal representing said actual motor torque with said third signal representing said rated torque;
   b. means for generating a control signal when said second signal representing actual torque exceeds said third signal representing rated torque thereby indicating a possible motor overheat condition; and
   c. means for utilizing said control signal ot reduce said motor load until said actual motor torque is equal to said rated torque.

15. Apparatus as in claim 12 further comprising:
   a. means for establishing a warning signal representing a value of actual torque with respect to peak torque at any given line voltage signifying approaching motor stall;
   b. means for comparing said second signal representing actual torque with said established motor stall warning signal;
   c. means for generating a control signal when said second signal representing actual torque exceeds said established motor stall warning signal thereby indicating approaching motor stall; and
   d. means for utilizing such control signal to reduce said motor load until said actual motor torque is less than said established stall warning signal.

16. Apparatus as in claim 10 wherein the means for generating a first signal representing the speed of said motor comprises:
   a. means for generating said signals representing actual instantaneous motor operating current;
   b. means for utilizing an algorithm to computer generate signals representing a motor current/speed characteristic curve at instantaneous line voltage; and
   c. means for generating a signal representing the speed of said motor by comparing said signals representing said instantaneous voltage and current with said signals representing said current/speed/voltage curve.

17. Apparatus as in claim 11 or 16 wherein the means of generating said second signal representing actual torque of said motor comprises:
   a. means for utilizing an algorithm to computer generate signals representing a motor speed/torque characteristic curve at said actual instantaneous line voltage, and
   b. means for generating said signal representing said actual torque of said motor by comparing said signals representing said actual instantaneous voltage and speed with said computer generated signals representing said torque/speed/voltage curve.

18. Apparatus as in claim 10 further including an induction motor as said electric motor.

19. Apparatus for determining the load on an electric motor having a known speed/torque relationship comprising:
   a. means for generating a first signal representing the instantaneous speed of said motor;
   b. means for generating a signal representing the actual instantaneous motor line voltage;
   c. means for comparing said first generated speed signal to data representing a known speed/torque relationship of said motor at said instantaneous line voltage to generate a second signal representative of instantaneous actual torque of said motor; and
   d. means coupled to said comparing means for visually displaying said second signal representing instantaneous actual torque of said motor.

20. Apparatus as in claim 18 wherein said visual display means displays said torque as a bar chart.

21. Apparatus for determining the load on an electric motor having a known speed/torque relationship comprising:
   a. means for generating a first signal representing the instantaneous speed of said motor;
   b. means for generating a signal representing the instantaneous motor line voltage; and
   c. means for comparing said first generated speed signal to data representing a known speed/torque relationship of said motor at said instantaneous line voltage to generate a second signal representative of instantaneous actual torque of said motor.

* * * * *

UNITED STATES PATENT AND TRADEMARK OFFICE
CERTIFICATE OF CORRECTION

PATENT NO. : 4,659,976

DATED : April 21, 1987

INVENTOR(S) : Fredrick R. Johanson

It is certified that error appears in the above-identified patent and that said Letters Patent are hereby corrected as shown below:

IN THE SPECIFICATION:

Column 4, line 22, the term "through" should be--though--.

Column 5, line 2, the term "40" should be--400--.

line 21, the term "One" should be -- On --.

Column 7, line 36, the term "whre" should be--where--.

IN THE CLAIMS:

Column 12, line 22, the term "determining" should be--providing a visual display of--.

line 39, the term "determining" should be--providing data representing--.

Signed and Sealed this

Sixteenth Day of February, 1988

*Attest:*

DONALD J. QUIGG

*Attesting Officer*   *Commissioner of Patents and Trademarks*